(12) United States Patent
Maguire

(10) Patent No.: US 10,077,764 B2
(45) Date of Patent: Sep. 18, 2018

(54) CART AND METHOD FOR DISPENSING LIQUID COLOR

(71) Applicant: Stephen B. Maguire, West Chester, PA (US)

(72) Inventor: Stephen B. Maguire, West Chester, PA (US)

( * ) Notice: Subject to any disclaimer, the term of this patent is extended or adjusted under 35 U.S.C. 154(b) by 385 days.

(21) Appl. No.: 14/627,698

(22) Filed: Feb. 20, 2015

(65) Prior Publication Data

US 2015/0233756 A1 Aug. 20, 2015

Related U.S. Application Data

(63) Continuation-in-part of application No. 14/458,681, filed on Aug. 13, 2014.

(60) Provisional application No. 61/942,135, filed on Feb. 20, 2014.

(51) Int. Cl.
| | |
|---|---|
| *F04B 19/22* | (2006.01) |
| *G01G 13/24* | (2006.01) |
| *G01G 17/04* | (2006.01) |
| *G01G 19/24* | (2006.01) |
| *B01F 13/10* | (2006.01) |
| *B01F 15/02* | (2006.01) |
| *B01F 15/04* | (2006.01) |

(52) U.S. Cl.
CPC .......... *F04B 19/22* (2013.01); *B01F 13/1066* (2013.01); *B01F 15/0445* (2013.01); *G01G 13/24* (2013.01); *G01G 19/24* (2013.01); *B01F 2015/0221* (2013.01); *G01G 17/04* (2013.01)

(58) Field of Classification Search
CPC ........ F04B 19/22; G01G 13/24; G01G 19/24; G01G 17/04; B01F 13/1066; B01F 15/0445; B01F 2015/0221
See application file for complete search history.

(56) References Cited

U.S. PATENT DOCUMENTS

| | | | | |
|---|---|---|---|---|
| 4,222,496 A | * | 9/1980 | Start ...................... | G01G 13/32 177/70 |
| 4,815,042 A | * | 3/1989 | Pratt ..................... | A01K 5/0216 141/104 |
| 4,830,508 A | * | 5/1989 | Higuchi .............. | B01F 13/1055 137/88 |
| 4,840,239 A | * | 6/1989 | Slagg ..................... | G01G 19/24 177/1 |
| 4,889,433 A | * | 12/1989 | Pratt ..................... | A01K 5/0216 141/104 |
| 5,268,849 A | * | 12/1993 | Howlett .............. | B01F 13/1055 141/103 |
| 5,340,211 A | * | 8/1994 | Pratt ..................... | A01K 5/0216 222/57 |
| 5,340,949 A | * | 8/1994 | Fujimura ............. | G01G 19/393 141/128 |
| 5,375,634 A | * | 12/1994 | Egger ................. | B01F 13/1055 141/100 |

(Continued)

*Primary Examiner* — Tony G Soohoo
(74) *Attorney, Agent, or Firm* — Fox Rothschild LLP

(57) ABSTRACT

A moveable scale for weighing containers of liquid color, having a weighing tray that may be moved from a weighing position to a non-weighing position. When in the non-weighing position, the weighing tray is low to the ground, allowing for easy loading and unloading. When in the weighing position, force is sensed by one or more load cells located between the weighing tray and a scale assembly, which allows accurate measurement of the weight container and its contents.

2 Claims, 6 Drawing Sheets

(56) References Cited

U.S. PATENT DOCUMENTS

| | | | | |
|---|---|---|---|---|
| 5,402,834 A * | 4/1995 | Levin | | G01G 17/06 |
| | | | | 141/100 |
| 5,464,047 A * | 11/1995 | Muscara | | B01F 13/1055 |
| | | | | 141/1 |
| 6,220,312 B1 * | 4/2001 | Hirsch | | G01G 3/125 |
| | | | | 141/83 |
| 6,321,798 B1 * | 11/2001 | Solignac | | B01F 15/0234 |
| | | | | 141/192 |
| 6,637,471 B2 * | 10/2003 | Luehrsen | | B01F 13/1055 |
| | | | | 141/104 |
| 2002/0174911 A1 * | 11/2002 | Bellin | | B67C 3/30 |
| | | | | 141/192 |
| 2003/0019537 A1 * | 1/2003 | Taylor | | B01F 13/1055 |
| | | | | 141/83 |
| 2003/0062095 A1 * | 4/2003 | Berghoff | | B65B 3/28 |
| | | | | 141/198 |
| 2004/0250873 A1 * | 12/2004 | Taylor | | B01F 13/1055 |
| | | | | 141/83 |
| 2005/0189037 A1 * | 9/2005 | Cortes Ferriz | | B01F 13/1055 |
| | | | | 141/102 |
| 2005/0247730 A1 * | 11/2005 | Post | | B01F 13/1058 |
| | | | | 222/144 |
| 2005/0269367 A1 * | 12/2005 | Post | | B01F 13/1058 |
| | | | | 222/185.1 |
| 2007/0012376 A1 * | 1/2007 | Khoo | | B01F 13/1055 |
| | | | | 141/87 |
| 2007/0012378 A1 * | 1/2007 | Miller | | B05B 1/28 |
| | | | | 141/104 |
| 2007/0044863 A1 * | 3/2007 | Engels | | B01F 13/1058 |
| | | | | 141/83 |
| 2007/0185619 A1 * | 8/2007 | Fermier | | B01F 13/1055 |
| | | | | 700/265 |
| 2008/0195250 A1 * | 8/2008 | Post | | C09D 7/14 |
| | | | | 700/233 |
| 2008/0257446 A1 * | 10/2008 | Oakes | | B01F 13/1055 |
| | | | | 141/1 |
| 2009/0126826 A1 * | 5/2009 | Smith | | B01F 13/1055 |
| | | | | 141/9 |
| 2012/0241045 A1 * | 9/2012 | Aouad | | B01F 1/0038 |
| | | | | 141/83 |
| 2015/0231583 A1 * | 8/2015 | Maguire | | G01G 19/24 |
| | | | | 366/141 |
| 2015/0233756 A1 * | 8/2015 | Maguire | | F04B 19/22 |
| | | | | 222/56 |
| 2016/0195423 A1 * | 7/2016 | Cassoni | | G01G 15/00 |
| | | | | 177/1 |

* cited by examiner

CART AND METHOD FOR DISPENSING LIQUID COLOR

CROSS-REFERENCE TO RELATED PATENT APPLICATIONS

This patent application is a 35 USC 120 continuation-in-part of U.S. patent application Ser. No. 14/458,681, now U.S. Pat. No. 9,815,036, filed 13 Aug. 2014 in the name of Stephen B. Maguire and entitled "Liquid Color Cart and Method for Liquid Color Dispensing", the priority of which is hereby claimed. This patent application also claims the priority under 35 USC 119 and 35 USC 120 of provisional U.S. patent application Ser. No. 61/942,135 filed 20 Feb. 2014 in the name of Stephen B. Maguire and entitled "Liquid Color Cart and Method for Liquid Color Dispensing." The disclosures of both the '681 and '135 applications are hereby incorporated by reference in their entirety.

BACKGROUND OF THE INVENTION

Field of the Invention

This invention relates generally to scales, and more specifically electronic scales for weighing drums, cylinders and other such containers, and to methods and apparatus for handling, weighing and dispensing liquid color.

Description of the Prior Art

Generally, scales used in industry for weighing containers are designed to be placed in a fixed location and the containers to be weighed must be brought to the scale. This is a drawback in many industrial settings where stock may be spread out over a large area of the facility and the containers are heavy and cumbersome to move.

Another disadvantage of existing scales, including portable scales, is that the weighing surface of the cart is supported by a substantial substructure, causing the weighing surface to be elevated some inches above the ground, forcing the user to lift the heavy container off of the floor in order to place it onto the deck.

SUMMARY OF THE INVENTION

In one of its aspects, this invention provides a cart that can both weigh and transport large containers of material, preferably liquid color. The cart preferably includes a weighing tray, a support assembly substantially supporting the weighing tray, and at least one weight sensor, preferably in the form of a load cell, between the weighing tray and the support assembly, so that weight measured by each weight sensor can used to determine the weight of a product located on the weighing tray. The support assembly includes a plurality of ground-contacting members, preferably wheels.

The cart preferably includes a device to convert a signal from the load cell into a measured weight.

The support assembly of the cart preferably includes at least one drive mechanism coupled to the weighing tray. The drive mechanism elevates the weighing tray. The drive mechanism preferably includes at least one pneumatic cylinder.

In another aspect, this invention provides a method of providing liquid color to be used in a plastic resin processing machine to fabricate finished or semi-finished plastic parts of a prescribed color. The method preferably includes the steps of: (a) providing a color recipe specifying weights of component colors to be blended to create a required color for fabricated parts to be of the prescribed color; (b) continuously sensing weight of a container; (c) sequentially adding each component color to the container until sensed increase in container weight equals the weight of the component color required by the recipe; (d) repeating step "c" until all of the component colors required by the recipe have been added; and (e) blending the component colors in the container.

The recited step of continuously sensing weight of the container is preferably performed by a load cell. The component colors that are added to the container are preferably single pigment dispersions.

DESCRIPTION OF THE PREFERRED EMBODIMENTS AND BEST MODE KNOWN FOR PRACTICE OF THE INVENTION

Liquid color, when manufactured, is the result of blending a number of different base pigments together to obtain the exact color and shade of color a customer wants. The accurate addition of each component is critical. Generally it is necessary to measure and dispense each component to an accuracy of 1 part per 1000, which is 1/10 of 1.0% of the total blend weight.

The components are generally mixed in a large container, such as a drum or barrel. The empty drum to be filled with liquid color may be a 30 gallon drum that can hold from 300 to 400 pounds, depending on bulk density of the blend. Once filled, the container is then transported to a desired location through the use of a cart or other transport device. This generally requires the now 300 to 400 pound drum to be manually lifted onto the cart, which can prove onerous.

This invention provides a cart that is able to gravimetrically measure the liquid color components being added to or removed from the drum while the drum is on the cart. This allows one to skip the step of having to load a heavy drum on to the cart after it has been filled. Further, the present invention allows one to determine the amount of liquid color in the drum without having to transport the drum to a scale, remove the drum from the cart, and place the drum on the scale. This is helpful in determining and correcting any loss of the liquid color in the drum.

Figure 1:
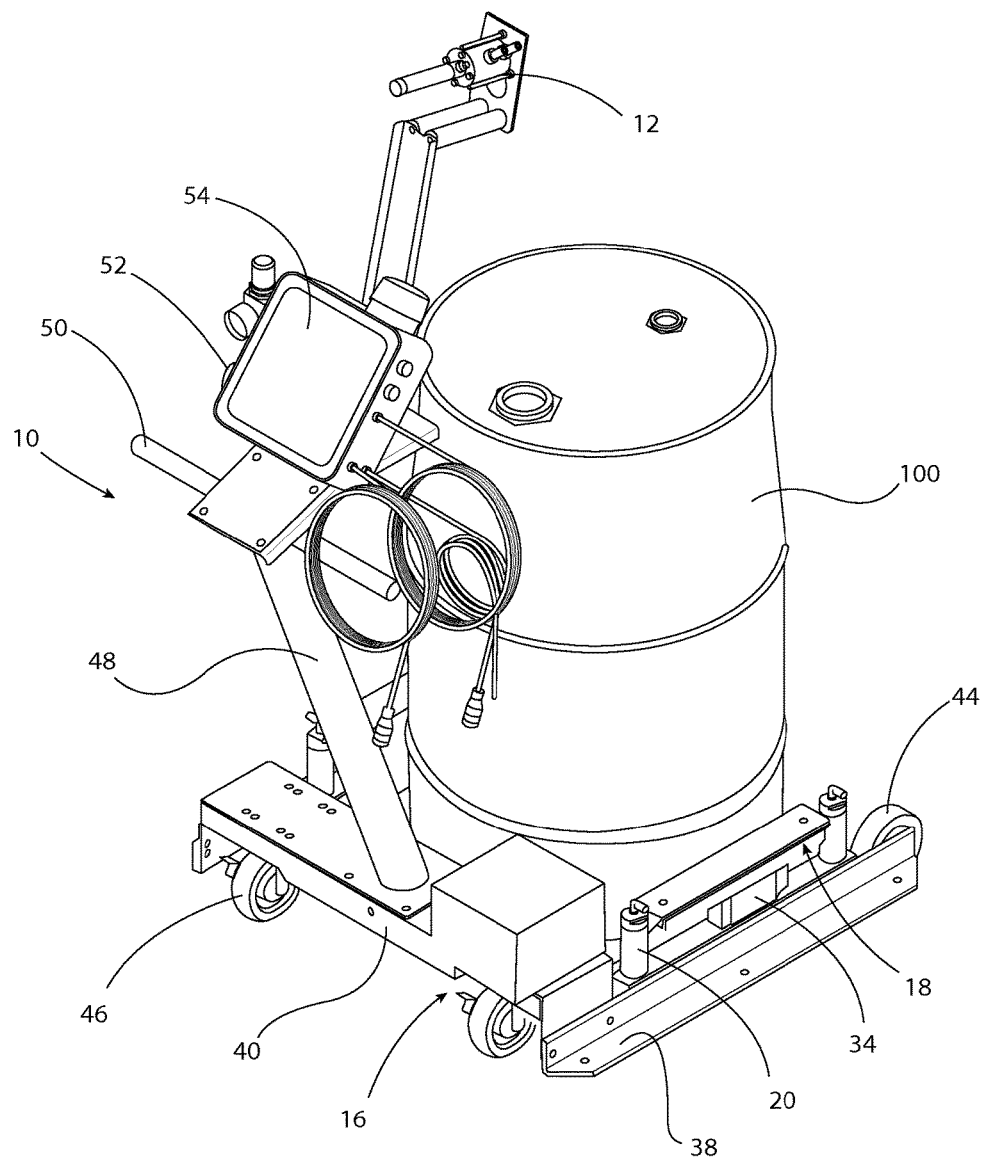
FIG. 1 is an isometric view of the back and the right side of a cart with a drum-like container, preferably of liquid color, in place on the cart, manifesting aspects of the invention.
Figure 2:
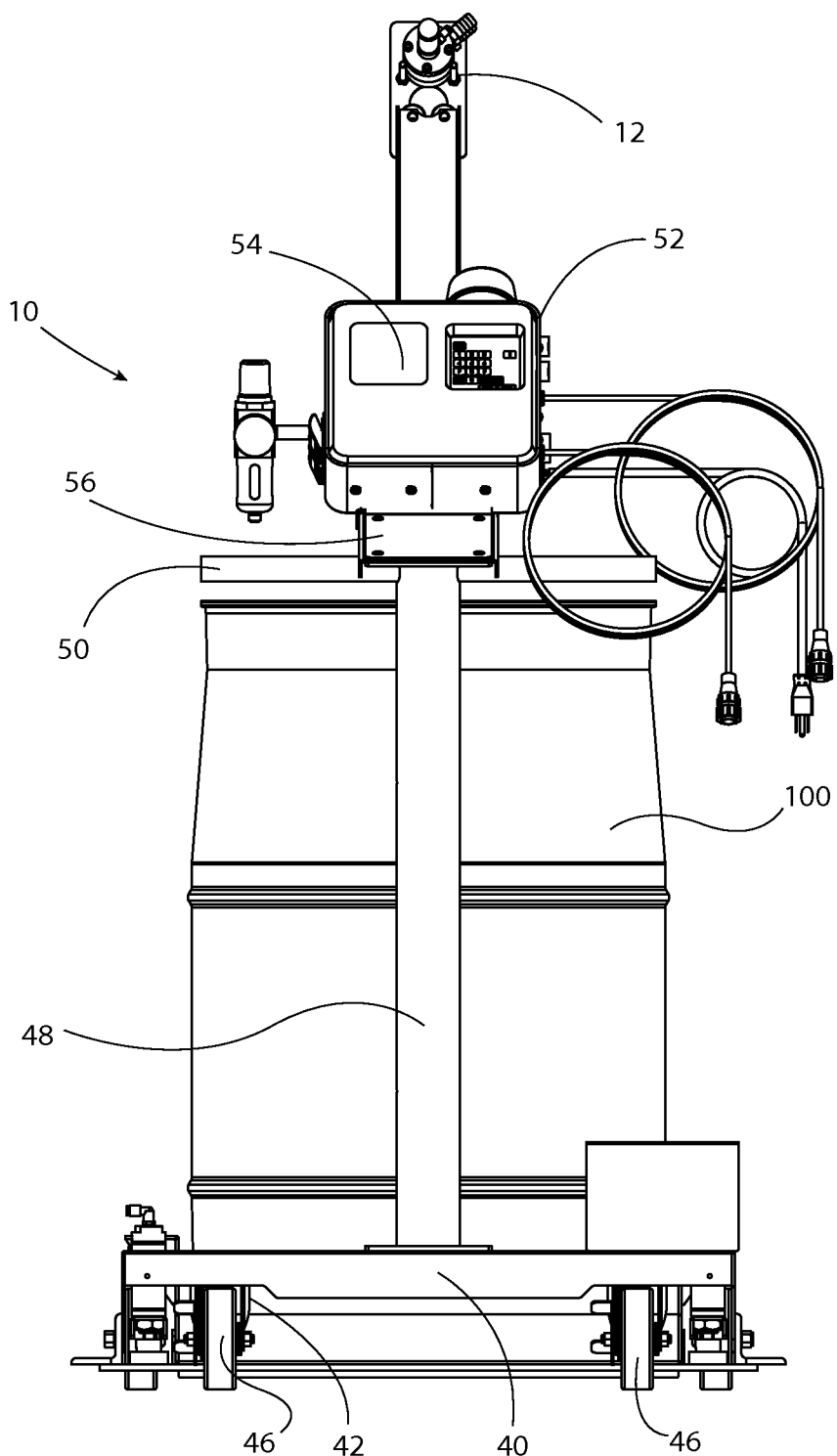
FIG. 2 is a view in elevation of the back of the cart shown in FIG. 1 with the drum/container in place on the cart.
Figure 3:
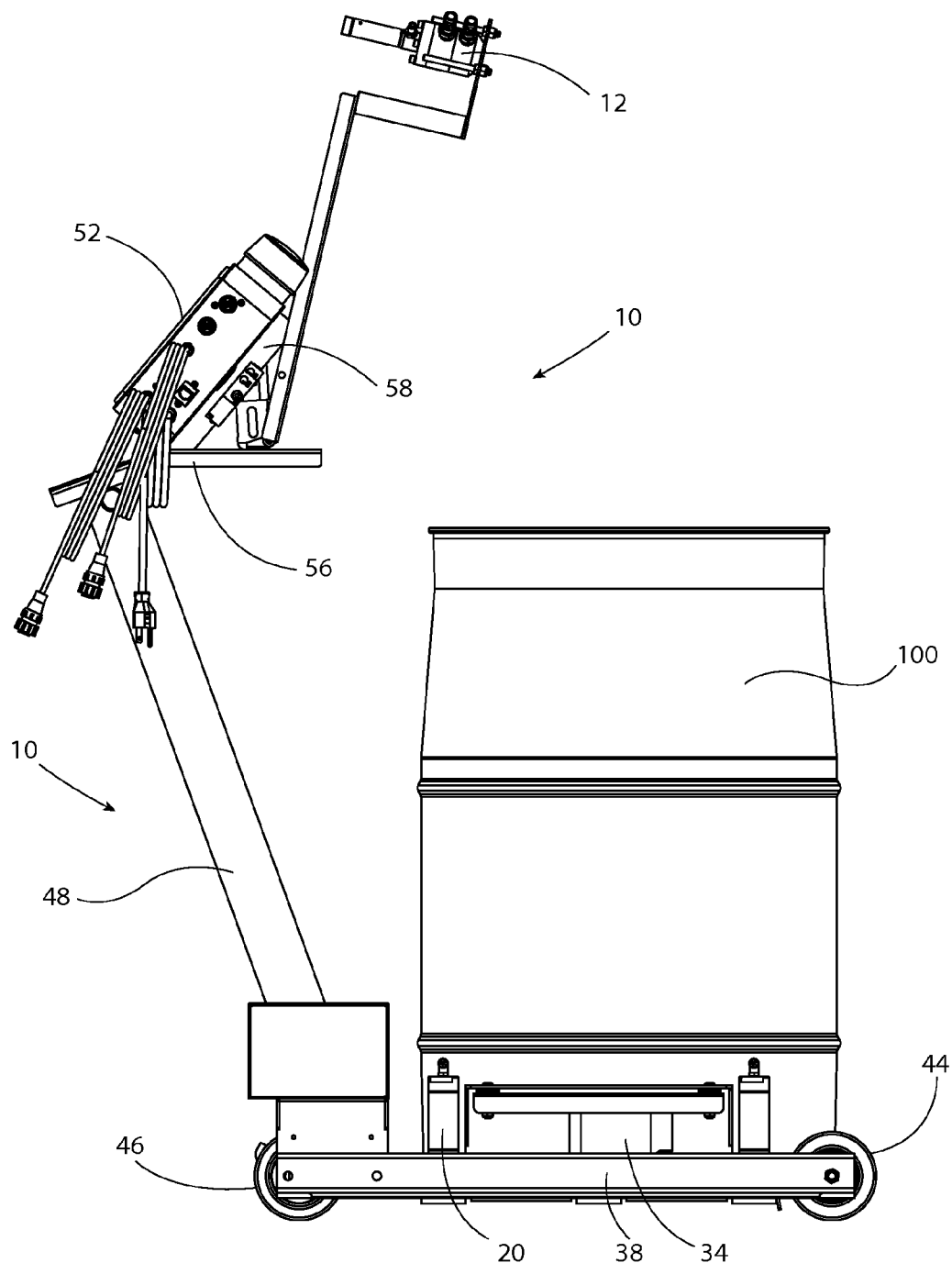
FIG. 3 is a right side view in elevation of the cart shown in FIGS. 1 and 2 with the drum/container in place on the cart.
Figure 4:
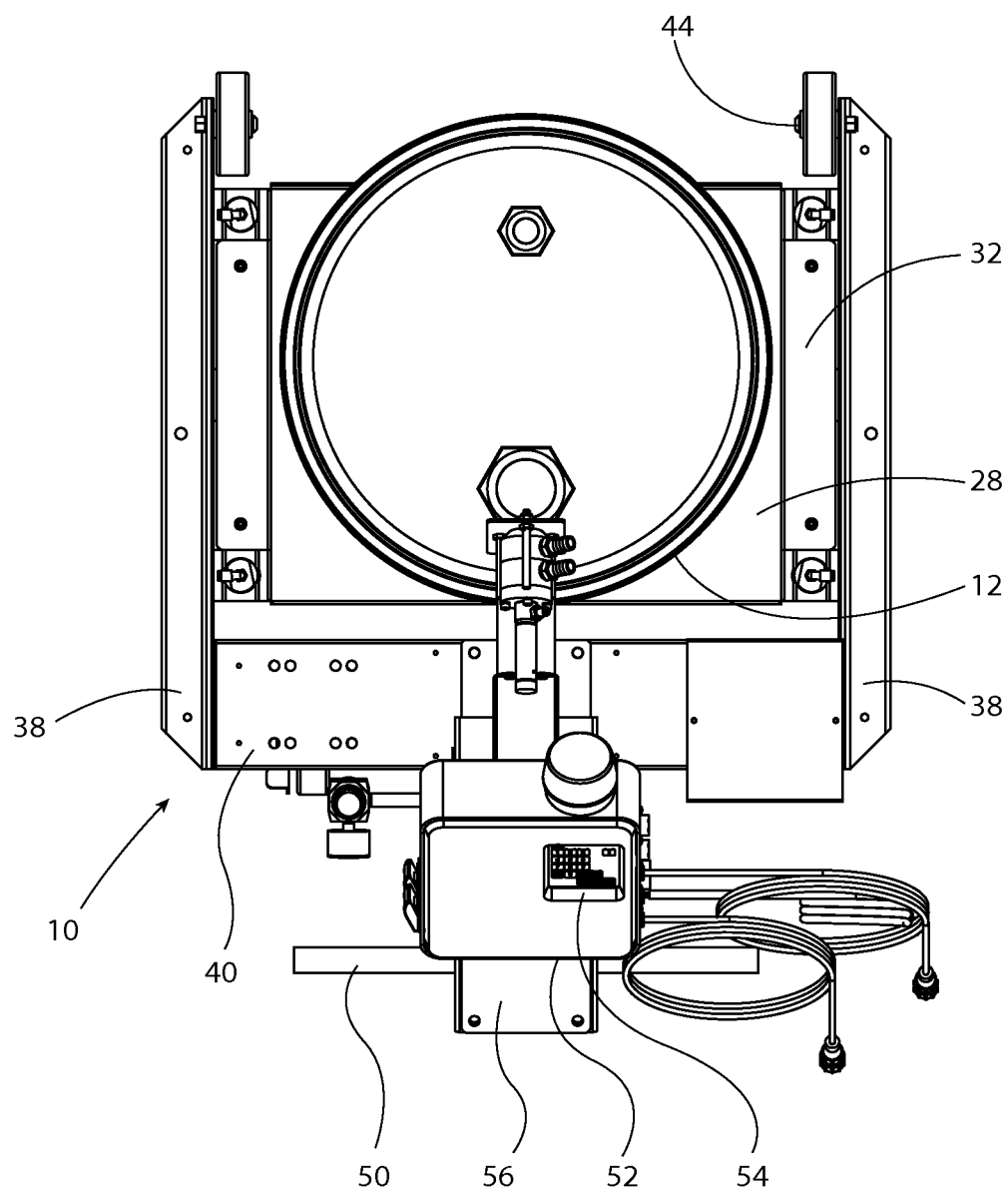
FIG. 4 is a top view of the cart shown in FIGS. 1, 2 and 3 with the drum/container in place on the cart.
Figure 5:
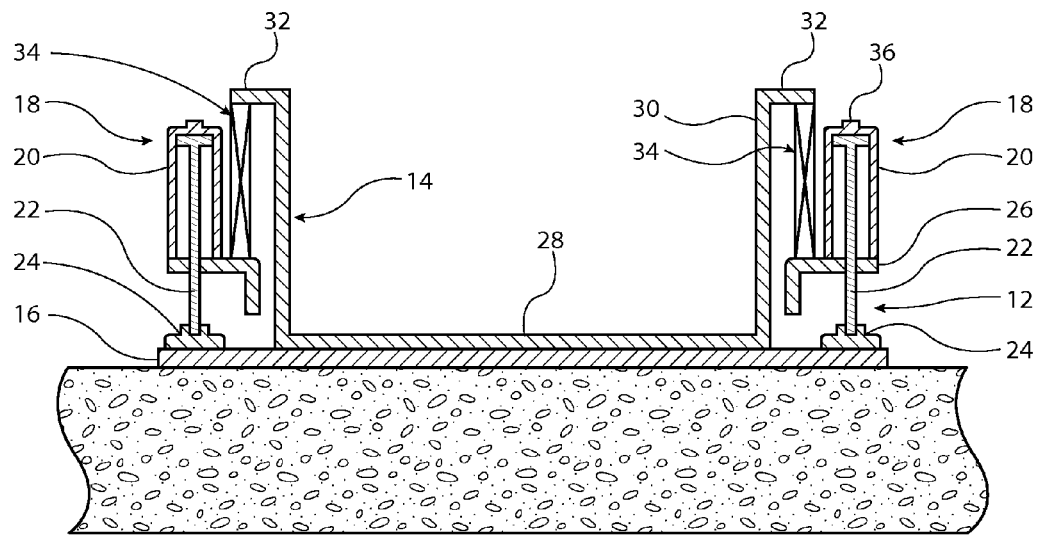
FIG. 5 is a broken partial schematic cross-sectional view of the weighing tray and support assembly of a cart manifesting aspects of the invention, with the weighting tray contacting the support assembly such that the weighting tray cannot be used to determine weight of any container that might be placed in the cart.
Figure 6:
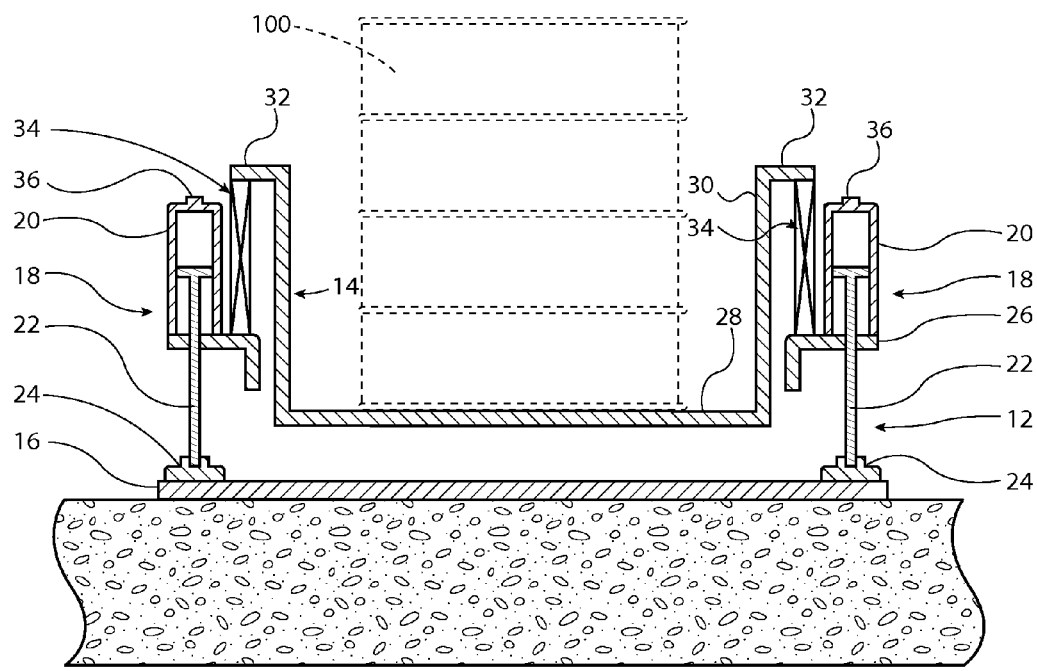
FIG. 6 is a broken partial schematic cross-sectional view of the weighing tray and support assembly similar to FIG. 5 but with a container/drum to be weighed shown in dotted lines and with the weighing tray in an elevated position for weighing.

The mechanical design of a cart 10 is illustrated in FIGS. 1-7. Referring preferably to FIGS. 5 and 6, cart 10 includes a generally rectangular base 16, a pair of support assemblies 18, and a weighing tray 14. The support assemblies 18 are mounted on and extend upwardly from respective sides of base 16. Support assemblies 18 each include a horizontal shelf 26, two pneumatic cylinders 20, two pistons 22, each residing in one of pneumatic cylinders 20, and couplings 24 that attach each piston 22 to the base 16, as shown best in FIGS. 5 and 6.

Base 16 includes lateral frame members 38 on each side, and a rear frame member 40 (see FIG. 1), with the front side of base 16 open to allow for easy loading and unloading of a drum 100 or other container on to weighing tray 14. Two rear wheel support members 42 extend downward from the underside of the rear frame member 40 (see FIG. 2). Front wheels 44 are attached to front ends of the lateral frame members 38 and rear wheels 46 are attached to the rear wheel support members 42 (see FIGS. 2 and 3).

A column 48 is connected at a distal end to rear frame member 40 by bolting or other detachable means and extends upwards. Handles 50 are attached to the proximal end of column 48. A controller unit 52 is also affixed to the proximal end of column 48 by means of a mounting bracket 56. Mounting bracket 56 includes an adjustable tray 58 allowing display monitor 54 of controller unit 52 to be angled so as to be easily visible by the user of cart 10 (see FIGS. 1, 2 and 3).

Weighing tray 14 is generally U-shaped, and includes a weighing tray base 28, two weighing tray arms 30, and projections 32 that extend from the top of weighing tray arms 30 generally parallel to shelf 26 of support assembly 18. Weight sensors, depicted in the illustrated embodiment as load cells 34, are located on both sides of weighing tray 14 (see FIGS. 5 and 6) and as such are positioned between respective projections 32 and respective shelves 26. Load cells 34 are electrically coupled to controller unit 52 preferably by a plurality of insulated wires running along and behind lateral frame members 38, under rear frame member 40, and inside column 48, up to controller unit 52.

Figure 7:
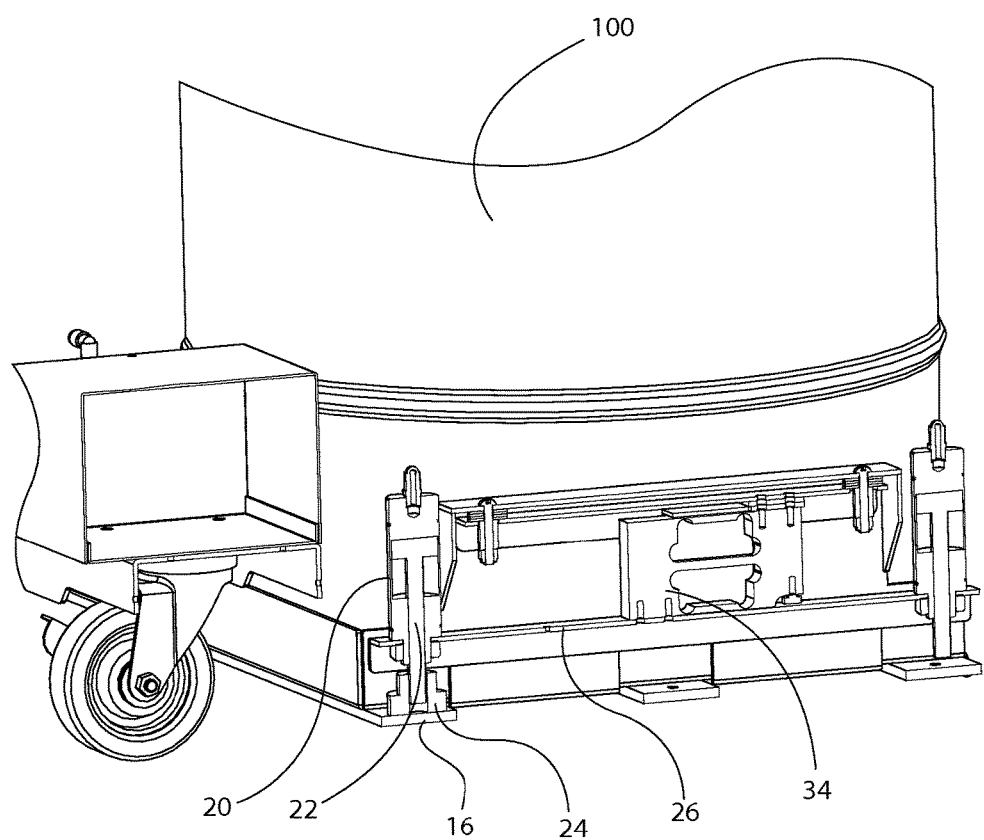
FIG. 7 is a broken enlarged cross-sectional view of a portion of the cart shown in FIGS. 1 and 6.

With particular reference to FIGS. 5, 6 and 7, support assemblies 18 of cart 10 move weighing tray 14 from a non-weighing position to a weighing position. FIG. 5 shows weighing tray 14 in a non-weighing position, in which weighing tray 14 rests on base 16. Weighing tray 14 preferably remains in this non-weighing position while moving cart 10, or while placing drum 100 on cart 10, or while removing drum 100 from cart 10. This ensures that load cells 34 are not supporting any weight, and therefore are safe from being damaged during these activities. Additionally, load cells 34 are preferably positioned to allow lower surface of cart weighing tray 14 to be very close to the floor. This allows heavy drums 100 to be moved onto weighing tray 14 while it is in the non-weighing position by simply tilting the drum and moving cart 10 to slide weighing tray 14 under drum 100.

FIG. 6 shows the weighing tray 14 in the weighing position. To transition to this position, compressed air or other fluid under pressure is injected through inlets 36 located at the top of pneumatic cylinders 20, thereby pushing the cylinders 20 upwards in relation to the stationary pistons 22. (Note that the rods of pistons 22 are fixed to base 16 by couplings 24 as shown in FIGS. 5 and 6). Because pneumatic cylinders 20 are mechanically coupled to shelf 26, as the top of cylinder 20 moves upward, shelf 26 moves in the same direction. As shelf 26 moves, it lifts load cell 34 upwardly and consequently lifts weighing tray 14 and weighing tray base 28 off of base 16.

With weighing tray 14 (as well as drum 100 and its contents) no longer supported by the base 16, downward force is applied to load cells 34, allowing load cells 34 to accurately measure the weight of the item located on weighing tray 14. Load cells 34 generate weight signal information that is sent to and processed by controller unit 52 to calculate the weight of drum 100 and/or its contents. The measured weight is displayed on the display monitor 54 and/or electronically recorded.

Accuracy in measuring the weight of the material in the drum is important. For example, for a 300 pound batch of the final liquid color product, it is necessary to measure and dispense into the drum each component to an accuracy of within three tenths (0.3) of a pound, or 135 grams. Load cells 34 on cart 10 can detect accurately to within 5 grams. (This is a tighter tolerance then is presently generally available in the industry. More common is 1/5000 of full scale reading, or 36 grams for a 400 pound batch of final product). To obtain such accuracy, the invention preferably uses two 90 kg load cells, for a 180 kg or 400 pound capacity.

Such accuracy is necessary in determining, as the drum is filled, exactly how much liquid color is going in. This is referred to as "Gain in Weight" or "GIW". Similarly, it is important to accurately detect exactly how much liquid color is being removed as the liquid color is pumped out of drum 100. This is referred to as "Loss in Weight" or "LIW".

Respecting GIW, as noted above liquid color when manufactured is the result of blending a number of different base pigments together to obtain the exact color and shade of color a customer wants. When using the presently described invention, this manufacturing process proceeds by placing an empty drum on cart 10, and filling the drum with liquid from source drums, each of which contains a single pigment dispersion. Each source drum is preferably fitted with a pump, and controller unit 52 preferably includes software written to control each pump in such a way as to assure exact amounts are metered from a source drum containing a liquid single pigment dispersion into the blended drum sitting on cart 10. (Examples of such pumps can be found in U.S. patent publication serial number 2013/334,258A1 and in U.S. Pat. Nos. 7,416,096; 7,980,834; and 8,800,821, the disclosures of all of which are incorporated herein by reference in their entireties). During this process, weighing tray 14 remains in the weighing position. As each liquid single pigment dispersion component is added to the drum, load cells 34 provide continuous reading of the exact weight that has been added. Once the specified weight of the first component is added, the single pigment dispersion component from the next source drum may be added. This process continues until the all of the desired components have been added in the preferred amounts. When all of the components have been added to drum 100, it is sealed and tumbled to blend all the single pigment dispersion components into one perfect, fully blended color, ready for use to color molded or extruded plastic parts.

Regarding LIW, cart 10 is also used to monitor "usage" of finished liquid color product as the liquid color is consumed by the user's process. Cart 10 allows the user, or seller of the liquid color, to meter exact amounts of liquid color into the process machine for every cycle the machine runs. For example, when molding a 500 gram part that requires 1% liquid, or 5 grams of liquid color per part, the process must accurately meter 5 grams of liquid color for every process machine cycle that produces one of the 500 gram parts. Cart 10 accomplishes this using a very accurate pump, which is designed to repeatedly meter the same amount every cycle. Controller unit 52 of cart 10 proceeds to adjust that amount as needed by monitoring the readings of load cells 34 that are part of cart 10 and determining how much weight of liquid color cart 10 is "losing", on average, with each cycle. While cart 10 cannot reliably detect what is used in one cycle or over a few cycles, over time cart 10 can very accurately determine an average. Based on that average, cart 10 can make small adjustments to the pump to target the exact 5 grams per cycle required for successful manufacture of the 500 gram parts.

The invention claimed is:

1. A method of providing liquid color to be used in a plastic resin processing machine to fabricate finished or semi-finished plastic parts of a prescribed color, comprising:
    a) providing a color recipe specifying weights of single pigment dispersion component colors to be blended to create a required color for fabricated parts to be of the prescribed color;
    b) continuously sensing weight of a drum-like container of at least 30 gallon capacity by supporting the container on a weighing tray which in turn is supported by a support assembly having a pneumatic piston-cylinder combination mechanism for elevating the weighing tray and drum-like container relative to the support assembly, the support assembly having a plurality of wheels for contacting the ground and facilitating movement about a facility of the support assembly, the weighing tray, and the drum-like container while all are supported by the tray, the weight of the container being determined by load cells positioned between the weighing tray and the support assembly;
    c) sequentially adding each single pigment dispersion component color to the container until sensed increase in container weight equals the weight of the component color required by the recipe;
    d) repeating step "c" until all of the single pigment dispersion component colors required by the recipe have been added;
    e) blending the single pigment component colors in the container.

2. A method for providing a selected amount of liquid color in a drum of at least 30 gallon capacity to a plastic resin process machine in a plastics molding and/or extrusion facility, for the process machine to use in fabricating finished or semi-finished plastic parts of a prescribed color, comprising the steps of:
    a) positioning, adjacent to the drum and close to a floor supporting the drum, a planar weighing tray portion of a movable wheeled cart, the cart having a weighing tray support assembly, said positioning being accomplished by rolling the cart on the cart wheels;
    b) tilting the drum and moving the cart to slide the weighing tray under the drum;
    c) moving the cart on the wheels to a position for supplying liquid color to the process machine;
    d) pneumatically lifting the weighing tray off the support assembly;
    e) providing a color recipe specifying weights of single pigment dispersion component colors to be blended to create a required color for the fabricated parts to be of the prescribed color;
    f) continuously sensing weight of the drum on the weighing tray using load cells mounted on the support assembly and supporting the weighing tray when in the raised position;
    g) sequentially adding each single pigment dispersion component color to the drum until sensed increase in drum weight equals weight of the component color required by the recipe;
    h) repeating step "g" until all of the single pigment dispersion component colors required by the recipe have been added to the drum;
    i) lowering the weighing tray to rest on the support assembly;
    j) mixing the drum contents of single pigment dispersion component colors into a uniform blend; and
    k) moving the cart on the wheels as needed to position the drum for furnishing the blended drum contents to the process machine.

* * * * *